United States Patent
Jorgenson et al.

[19]

[11] Patent Number: 5,990,872
[45] Date of Patent: *Nov. 23, 1999

[54] KEYBOARD CONTROL OF A POINTING DEVICE OF A COMPUTER

[75] Inventors: Rodney W. Jorgenson, Sioux City, Iowa; Anthony M. Grasso, North Sioux City, S. Dak.; Michael J. Ritter; Michael R. Sassman, both of Sioux City, Iowa

[73] Assignee: Gateway 2000, Inc., North Sioux City, S. Dak.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,652
[22] Filed: Oct. 31, 1996
[51] Int. Cl.$^6$ .................................................. G09G 5/00
[52] U.S. Cl. .......................... 345/168; 345/157; 345/160; 345/172; 364/709.12
[58] Field of Search ...................................... 345/168, 172, 345/157, 145, 160, 146; 364/709.11, 709.12, 709.16; 341/22

[56] References Cited

U.S. PATENT DOCUMENTS

| 4,514,726 | 4/1985 | Whetstone et al. ...................... 340/710 |
| 4,931,781 | 6/1990 | Miyakawa ............................... 340/706 |

(List continued on next page.)

FOREIGN PATENT DOCUMENTS

| 0 596 594 | 5/1994 | European Pat. Off. . |
| 0602947 | 6/1994 | European Pat. Off. . |
| 29615333 | 10/1996 | Germany . |
| WO96/06486 | 2/1996 | WIPO . |

OTHER PUBLICATIONS

"Mouse with Ears", Reproduced from Research Disclosure, No. 332, Kenneth Mason Publications Ltd, England, 1 page (Dec. 1991).

"Multimedia: Panasonic introduces multimedia notebook PC with Pentium 90 MHz CPU", *EDGE: Work–Group Computer Report*, vol. 6; No. 270; p. 21, EDGE Publishing, 5 pages, (Jul. 24, 1995).

"Panasonic notebook has internal CD–ROM drive", *Newsbyte News Network*, 2 pages. (Sep. 21, 1994).

Messmer, H., "The Indispensable PC Hardware Book— Your Hardware Questions Answered", Second Edition, Addison–Wesley Publlishing Company, (1995).

"Toshiba delivers first mobile Pentium notebook computer", *Business Wire*; Section 1, p. 1, 4 pages, (Oct. 10, 1994).

Duncan, R., "An Examination of DevHlp API; writing OS–2 biomodal device drivers", *Microsoft Systems Journal*, vol. 3, No. 2, p. 39, 11 pages, (Mar. 1988).

(List continued on next page.)

*Primary Examiner*—Daniel J. Wu
*Assistant Examiner*—John Tweel, Jr.
*Attorney, Agent, or Firm*—Schwegman, Lundberg, Woessner & Kluth P.A.; Anthony Claiborne

[57] ABSTRACT

A computerized system for keyboard control of a pointing device of a computer. The computer has a computer keyboard, a controller and a basic input/output system (BIOS). The keyboard has a plurality of keys for entry of one or more predetermined sequences of one or more keystrokes by a user of the computer, each sequence corresponding to a control instruction of the pointing device. The controller detects entry of the sequences by the user on the keyboard, and furthermore processes signals received from the pointing device. The BIOS is operatively coupled to the controller, and in response to the controller detecting a predetermined sequence of keystrokes entered by the user on the keyboard operating sends the controller a corresponding instruction as to whether the controller should listen to or ignore signals received from the pointing device. Alternatively, the functionality of the BIOS as to the pointing device is incorporated within the keyboard. Alternatively still, the BIOS acts on the instructions, instead of the controller acting on the instructions.

5 Claims, 3 Drawing Sheets

U.S. PATENT DOCUMENTS

| | | | |
|---|---|---|---|
| 4,937,778 | 6/1990 | Wolf et al. | 345/168 |
| 4,994,795 | 2/1991 | MacKenzie | 340/710 |
| 5,186,629 | 2/1993 | Rohen | 434/114 |
| 5,197,147 | 3/1993 | Long et al. | 364/709.12 |
| 5,214,421 | 5/1993 | Vernon et al. | 345/168 |
| 5,305,449 | 4/1994 | Ulenas | 346/160 |
| 5,331,337 | 7/1994 | Kabeya et al. | 345/172 |
| 5,404,321 | 4/1995 | Mattox | 345/172 |
| 5,550,562 | 8/1996 | Aoki et al. | 345/163 |
| 5,563,628 | 10/1996 | Stroop | 345/156 |
| 5,608,895 | 3/1997 | Lee | 345/157 |
| 5,623,261 | 4/1997 | Rose | 345/172 |

OTHER PUBLICATIONS

Hildreth, S., "DISCUIT: V1.4 Compact Disc Player", *America Online; File: DISC104.ZIP* 1 page, (Nov. 29, 1995).

Knize, R., "SUPERCD: Super CD v2.5 Music CD Player", *America Online; File DUPRCD@$.ZIP*, 2 pages, (Feb. 17, 1996).

Moon, C.G., "PROCD: V5.05 CD Music Player", *America Online; File: PROCD505.EXE*, 2 pages, (Jun. 22, 1994).

KEYBOARD CONTROL OF A POINTING DEVICE OF A COMPUTER

FIELD OF THE INVENTION

This invention relates generally to keyboard control of a pointing device of a computer, and more particularly to such keyboard control through the basic input/output system (BIOS) and/or keyboard controller of the computer.

BACKGROUND OF THE INVENTION

Personal computers, such as the Gateway 2000 personal computer, typically come equipped with a pointing device such as a touch pad or a mouse. Furthermore, laptop computers, such as the Gateway Solo, increasingly come equipped with a pointing device built in, which is more convenient for a user of the computer than if he or she were always forced to plug in an external pointing device in the back of the computer. Keyboards for desktop computers are mirroring this trend, and are increasingly including a built-in pointing device such as a touch pad as well. A pointing device allows the computer user to, among other things, control a pointer on the screen in a windows-based operating environment, such as Microsoft Windows 3.11 or 95.

A touch pad is a touch-sensitive pad. The pad detects the positions at which the user is moving his or her finger on the pad, and conveys this information to the computer. The computer then moves the pointer based on the information. The touch pad typically allows the "clicking" of a button within a window in the windows-based operating environment in one of two ways. First, the touch pad may have separate buttons for this function. Second, the touch pad may allow the user to tap the pad to effect a click.

A mouse is a device that has freedom of movement within a two-dimensional plane. The mouse detects the direction, and typically the speed, in which the user is moving the device, and conveys this information to the computer. The computer then moves the pointer on the screen in the corresponding direction, with the corresponding speed. The mouse typically allows for clicking via one or more separate buttons located on the mouse.

Regardless of which pointing device is installed on a particular computer, there are situations in which the user needs to disable the pointing device. Many users adopt a hand position over the keyboard that increases the likelihood that the pointing device will be accidentally touched. For example, many users place their thumb below the space bar so that the bar can be easily pressed when needed. However, laptop computers with integral pointing devices, as well as keyboards with integral pointing devices, typically position the pointing device in just this same place. Thus, the potential for such users to accidentally press the pointing device is quite high.

Furthermore, the user may have more than one pointing device at his or her disposal. This is frequently the case where a user using a laptop computer having an internal touch pad on a desktop plugs in an external mouse. The user may wish to disable the internal touch pad so that only the external mouse is active, so that the potential for accidental pointer movement or clicking is diminished. However, most laptop computers do not usually allow for the disabling of an internal pointing device, and the user cannot easily unplug the device because it is internal.

The user may also have more than one pointing device at his or her disposal on a desktop computer. Even though such devices are external and hence capable of being unplugged, unplugging an unwanted or unnecessary device in such a situation is frequently difficult and undesirable. The device typically is plugged into the back of the computer, which is usually hard to get to. Furthermore, frequent plugging and unplugging of a device into a port on back of the computer may wear out the port, such that it no longer allows for a pointing device to make a stable connection to the computer.

There is a need, therefore, for providing for control of one or more pointing devices attached to a computer, so that any of the devices can be selectively disabled or enabled by a user of the computer. There is a further need for providing such control in a way that does not require the user to physically unplug a pointing device in order to disable it.

SUMMARY OF THE INVENTION

This invention relates to keyboard control of a pointing device attached to a computer. In one embodiment of the invention, a computer comprises a keyboard, a controller and a basic input/output system (BIOS). The controller recognizes entry of two predetermined sequences of keystrokes by a user on the keyboard, a first sequence of keystrokes for allowing the user to signal to the computer to disable the pointing device, and a second sequence for allowing the user to signal to the computer to enable the pointing device. The controller also processes signals received from the pointing device. The BIOS in response to the controller detecting the first sequence instructs the controller to ignore signals received from the pointing device, and in response to the controller detecting the second sequence instructs the controller to interpret signals received from the device.

Alternatively, the BIOS receives signals from the pointing device through the controller, and itself respectively ignores or interprets them.

In this manner, the present invention allows for a number of advantages. The invention provides for control of a pointing device, allowing a user to either disable or enable the pointing device by entering in a sequence of keystrokes. Thus, the pointing device can be controlled without having to constantly unplug and plug the device into the computer, in the case of a desktop computer. In the case of a laptop computer having an internal pointing device, the invention allows for control where none was conveniently accessible before.

Furthermore, the present invention allows for a number of other advantages. First, because control is implemented within the BIOS of a computer, it is not dependent on any particular operating system. In addition, the present invention is not a computer program executed by the operating system, and therefore cannot conflict with any program within memory that is executed by the operating system. That is, the present invention is executed at a very low level within the computer architecture (the BIOS) to avoid conflicts with programs.

Finally, the present invention allows for immediate and automatic access to keyboard control of the pointing device. The BIOS of a computer is active automatically as soon as a user turns on the computer. The user, therefore, does not have to specifically load a program into memory in order to activate the present invention. In this way, too, the present invention is active at all times. The user, for example, does not have to click on a task button on a task bar prior to using the invention.

In a further embodiment of the invention, the BIOS of the computer includes means for receiving a scan code sent by the controller in response to detecting one of the two predetermined sequences of keystrokes entered by the user on the keyboard. The BIOS also includes means for looking up an instruction corresponding to the scan code in a look-up table. The table has a first instruction corresponding to the first predetermined sequence, and a second instruction corresponding to the second predetermined sequence. The BIOS also has a means for passing the instruction back to the keyboard controller.

In yet a further embodiment of the invention, the computer has coupled to it two or more pointing devices. Furthermore, the controller only detects one predetermined sequence of keystrokes entered by the user on the keyboard. In response to the controller detecting this sequence, the BIOS sends the controller the next of a predetermined repeating cycle of two or more instructions, or alternatively the BIOS processes these instructions itself. In one embodiment, this repeating cycle of instructions comprises an instruction to ignore the first pointing device and listen to the second pointing device, to listen to the first pointing device and ignore the second pointing device, to ignore both pointing devices, and to listen to both pointing devices.

Other embodiments of the invention include a computer having such a BIOS, the BIOS itself, and a method comprising the steps of detecting one or more predetermined sequences of keystrokes entered by a user on a keyboard, and signaling a keyboard controller to either ignore or interpret the commands received from one or more pointing devices. Still other embodiments include a keyboard controller modified to incorporate the functionality regarding the pointing device or devices that heretofore has been ascribed to the BIOS. Still other and further aspects and advantages of the present invention will become apparent in the following description and by reference to the accompanying drawings.

DETAILED DESCRIPTION OF THE DRAWINGS

Figure 1:
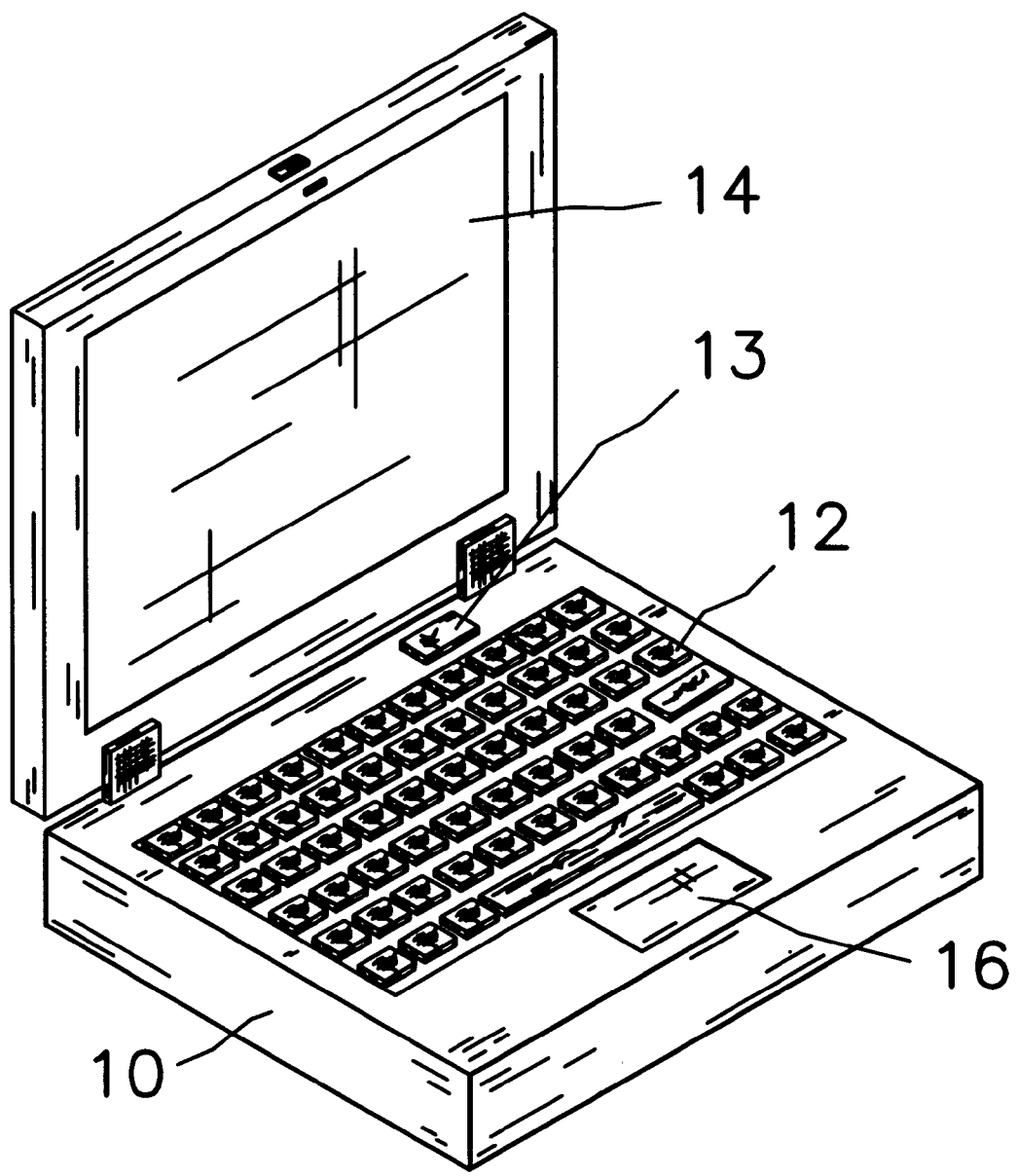
FIG. 1 is a diagram of a computer in which the present invention typically is implemented.

The present invention effects keyboard control of a pointing device of a computer. The present invention is not limited as to the type of computer on which it runs. However, a typical example of such a computer is shown in FIG. 1. Computer 10 is a laptop computer, and may be of any type, including a Gateway Solo, etc. Computer 10 usually includes keyboard 12, display device 14 and pointing device 16. Display device 14 can be any of a number of different devices, including liquid crystal display (LCDs), gas plasma displays, etc. Pointing device 16 as shown in FIG. 1 is a touch pad, a touch-sensitive pad that detects the relative position at which the user is pressing his or her finger down against it, to allow the computer to place the pointer on the display device at a corresponding position. The invention, however, is not limited to a particular pointing device. Pointing device 16 in another embodiment is a mouse, a device that detects the change of position of the device, to allow the computer to move the pointer accordingly.

Furthermore, as shown in FIG. 1, pointing device 16 is an internal device. However, the present invention is not so limited. Device 16 could be external without departing from the scope and spirit of the present invention. Similarly, as those skilled in the art will appreciate, computer 10 could be a desktop computer instead of a laptop computer. In such an embodiment, pointing device 16 is typically an external device plugging into a port on the back of the computer. Alternatively, pointing device 16 is integral to an external keyboard plugged into such a computer, as is found in the art. Not shown is that computer 10 typically also comprises a random-access memory (RAM), a read-only memory (ROM), a central-processing unit (CPU), a fixed storage device such as a hard disk drive, and a removable storage device such as a floppy disk drive.

As shown in FIG. 1, although not required under the present invention, computer 10 also includes status display 13. On a laptop computer, the status display typically indicates whether the caps lock is on, whether the num lock is on, and usually other laptop-centric features such as whether the laptop is currently being powered by battery or by AC power, and the current charge of the battery. In one embodiment of the present invention, status display 13 also indicates the status of the pointing device coupled to the computer. That is, status display 13 indicates whether the pointing device is enable or disabled. Thus, when the pointing device is enabled under the present invention, status display 13 indicates this information, and also indicates when the pointing device is disabled. Status display 13 can be of any of a number of different displays, but usually is a liquid-crystal display (LCD), of the type normally found on small hand-held calculators.

Figure 2:
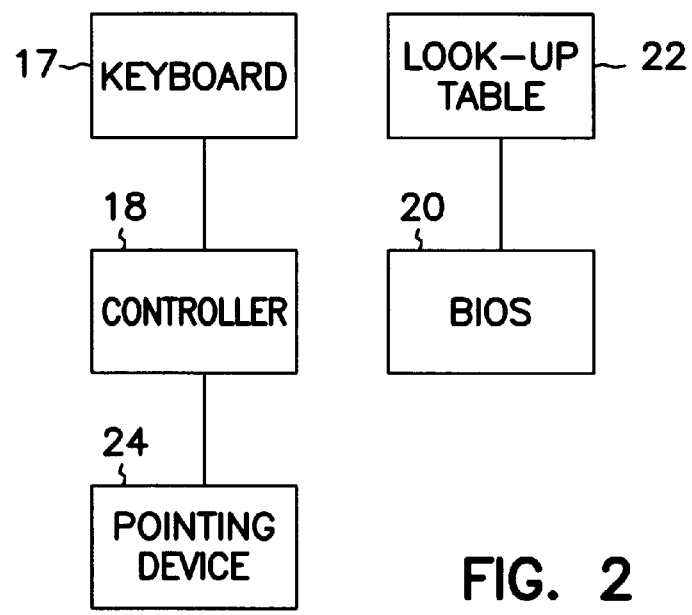
FIG. 2 is a block diagram of one embodiment of the present invention.

Referring now to FIG. 2, a block diagram of one embodiment of the present invention is shown. Keyboard 17 is coupled operatively to keyboard controller 18. Keyboard controller 18 is operatively coupled to BIOS 20, which itself is operatively coupled to look-up table 22. Controller 18 is also operatively coupled to pointing device 24. As those skilled in the art will readily appreciate, the block diagram of FIG. 2 does not disclose the physical devices in which the various components of the block diagram reside.

For example, controller 18 typically resides in the computer (e.g., computer 10 in FIG. 1), also BIOS 20 and look-up table 22 typically reside within the computer itself (e.g., computer 10 in FIG. 1). Pointing device 24 in one embodiment is internal and resides within the computer, whereas in another embodiment of the invention is external to the computer. The present invention is not limited to any particular component residing in any particular physical device.

Controller 18 is a keyboard controller, typically an integrated circuit (IC) such as the Intel 80C51SL. Controller 18 constantly scans circuits leading to the key caps of the individual keys within keyboard 17. It detects the increase or decrease in current from the key that has been pressed. By detecting either an increase or a decrease in current, the controller can tell both when a key has been pressed and when it has been released. Each key has a unique set of codes associated with the key.

As those skilled in the art understand, these codes are known as scan codes. There are two scan codes for each key, one for when the key is depressed and the other for when the key is released. When a user presses or releases a key, controller 18 stores the associated scan code in its buffer, and then signals BIOS 20 via an interrupt request, typically IRQ 1, that it has a scan code waiting in its buffer. BIOS 20 then receives this scan code from controller 18. Upon receiving the scan code, BIOS 20 instructs controller 18 to delete the scan code from its buffer.

As those skilled in the art understand, BIOS 20 is a Basic Input/Output System, which is a set of programs typically installed in the ROM of a computer and executed by the CPU of a computer, and which provides the most basic control and management of the computer's hardware. In another embodiment of the invention BIOS 20 is installed in the hard disk drive of the computer. As those skilled in the art can appreciate, the BIOS can reside on any computer-readable storage device, such as a hard disk, floppy disk, removable tape cartridge, etc., without departing from the scope of the invention. Upon the computer being booted, BIOS 20 is typically transferred into RAM, and it is this copy of the BIOS that typically is used to provide the basic control and management of the computer's hardware. As compared to the other levels of software of a computer (operating system and stand-alone programs), the BIOS is the bottom-most software layer in the computer. It functions as the interface between the hardware and the other layers of software, isolating them from the details as to how the underlying hardware is actually implemented. Thus, the underlying hardware can change without affecting the higher level software.

BIOS 20, upon receiving a scan code from controller 18, determines if the scan code correspond to one of the ordinary shift keys or one of the keys that are considered to be special shift keys and toggle keys—CTRL, ALT, NUM LOCK, CAPS LOCK, SCROLL LOCK, FUNCTION, INSERT, etc. If the scan code corresponds to one of the latter keys, BIOS 20 maintains a record of which of these keys are being pressed, typically by changing what is known as a "shift-state" byte. For all other keys, BIOS 20 translates the scan code by looking up the scan code, along with the record of which of the shift keys, special shift keys and toggle keys are currently being pressed, in look-up table 22. Look-up table 22 is also typically implemented within the ROM of a computer (e.g., computer 10 of FIG. 1), although the present invention is not so limited. After translating the scan code by looking it up in table 22, BIOS 20 executes the corresponding instruction. If BIOS 20 looks up a scan code corresponding to a touch pad control instruction, BIOS 20 signals controller 18 to disable or enable pointing device 24, depending on the instruction. When controller 18 is signaled by BIOS 20 to disable device 24, it does not listen to or interpret input from the device. When controller 18 is signaled by BIOS 20 to enable device 24, it listens to and interprets input from the device.

In the embodiment where the device is a mouse, for example, controller 18 informs the computer of the direction and speed in which the mouse is moving, and the computer typically moves the pointer on the display device in a corresponding direction. In the embodiment where the device is a touch pad, controller 18 conveys to the computer the relative position on the pad on which pressure is being placed, and the computer typically places the pointer on the display device in a corresponding position. The manner in which the controller informs the computer of such signals. This is well understood by those of ordinary skill in the art.

Thus, the present invention as shown in FIG. 2 works as follows. Controller 18 detects a series of keystrokes entered on the keyboard and sends the scan codes corresponding to the keystrokes to BIOS 20. BIOS 20 translates the scan code by looking up the scan code, along with the record of which of the shift keys, special shift keys and toggle keys are also currently being pressed, in look-up table 22. If the keystrokes entered on the keyboard correspond to the disable pointing device instruction or the enable pointing device instruction, then BIOS 20 signals controller 18 to follow the instruction (i.e., to either ignore or listen to input received from the pointing device).

The present invention is not limited to any particular set of keystrokes mapped to either instruction of enabling or disabling the pointing device. Furthermore, the present invention is not limited to any particular alphabet as well—a Japanese or German keyboard, for example, can be utilized according to the present invention, and having associated keystrokes with Japanese- or German-language keys, without departing from the scope of the invention. Any keystroke can be mapped to either instruction without departing from the scope of the present invention. In one particular embodiment, the keystroke sequence of holding down the function key while pressing the 'D' key corresponds to disabling the pointing device. In another particular embodiment, the keystroke sequence of holding down the function key while pressing the 'E' key corresponds to enabling the pointing device.

Thus, if the keystroke FUNCTION 'D' is pressed, the controller would signal this information to the BIOS. The BIOS would then look up in the look-up table that this keystroke corresponds to the disable pointing device instruction, and signal the controller to ignore signals received from the pointing device. The controller would then not listen to signals received from the pointing device. In a similar manner, the keystroke FUNCTION 'E' would cause the controller to enable the pointing device, and listen to and process signals received from the pointing device. As those skilled in the art understand, different keystrokes can be implemented under the present invention without departing from the scope of the invention.

As discussed in conjunction with FIG. 2, the present invention allows for a number of advantages. Foremost, the invention provides for control of a pointing device, allowing a computer user to disable or enable the pointing device by entering in a sequences of keystrokes on a computer keyboard. This allows the user to control the device without having to unplug and plug the device into the computer, and avoids unnecessary wear and tear on the ports into which such a device is plugged into on the back of the computer. Furthermore, as shown in FIG. 1 where the computer is a laptop computer, the invention allows for control where none was before possible.

The present invention also allows for the prevention of accidental activation of the pointing device by a user of the computer. Many users employ a hand position when typing that places their thumbs directly over where an integral pointing device of a laptop or an external keyboard for a desktop computer is located, below the space bar. By allowing such users to conveniently disable the pointing device, the present invention decreases the potential for users accidentally pressing on the pointing device, and correspondingly move the pointer on the screen. Furthermore, the present invention decreases the potential for accidental "clicks" which may occur when the pointing device is tapped, in the case where the pointing device is a touch pad.

Because the present invention is implemented with the BIOS of a computer, which typically resides in ROM, the present invention is operating system independent. That is, as those skilled in the art understand, the BIOS of a computer is at a lower level within the computer's architecture than is the operating system. Any operating system implemented on a computer generally must interact with that computer's BIOS. By implementing keyboard control of the pointing device within BIOS, the present invention is not tied to any one particular operating system, and can be used with any operating system.

Furthermore, because the present invention is implemented within the BIOS, it is typically compatible with existing stand-alone programs. Stand-alone programs are at a higher level within the computer architecture than operating systems, as those skilled in the art understand. A given program will access the operating system, which then accesses the BIOS, which then accesses the hardware. Because the present invention implements its functionality at a different (lower) level within the computer architecture as compared to stand-alone programs, the potential for incompatibility caused by the present invention is greatly reduced.

In addition, the present invention allows for immediate and automatic functionality as soon as a user turns on the computer. As those skilled in the art understand, as soon as the computer is turned on, the BIOS thereof typically conducts a series of complex tests of all the hardware devices installed on the computer. This is known as Power-On Self Test (POST). After this self test is conducted, the operating system of the computer is then loaded. By the time the operating system is loaded the BIOS is already functioning; the functionality afforded by the present invention is available to the user automatically and immediately. The user does not have to load or otherwise start the present invention.

Finally, the present invention allows for keyboard control of the pointing device to always be active. When an appropriate sequence of keystrokes is entered into the keyboard, the BIOS instructs the keyboard controller to disable or enable the device. Because the BIOS is lower level than the operating system or a stand-alone program, the BIOS instructs the controller to perform an instruction before the operating system or a stand-alone program can act on the keystroke. Thus, entering in the predetermined keystrokes permits such control regardless of what the operating system is doing, and regardless of what stand-alone program is running on the operating system.

The present invention allows for embodiments incorporating modifications to the embodiment shown in FIG. 2, without departing from the spirit or scope therefrom. As shown in FIG. 2, and as has been discussed in conjunction thereto, the BIOS sends instructions to the keyboard controller as to how to act on signals received from the pointing device (i.e., either ignore or interpret them). However, in another embodiment of the invention, these signals from the pointing device as detected by the controller are sent to the BIOS, which itself acts on the signals (either ignoring or interpreting them).

Furthermore, as shown in FIG. 2, the BIOS looks up scan codes in the look-up table to determine the appropriate command that either it or the keyboard controller should execute regarding the pointing device. However, in another embodiment of the invention, the look-up table is operably coupled to the controller, and it is the controller that looks up the scan codes in the table, and determines the appropriate command to be executed.

Figure 3:
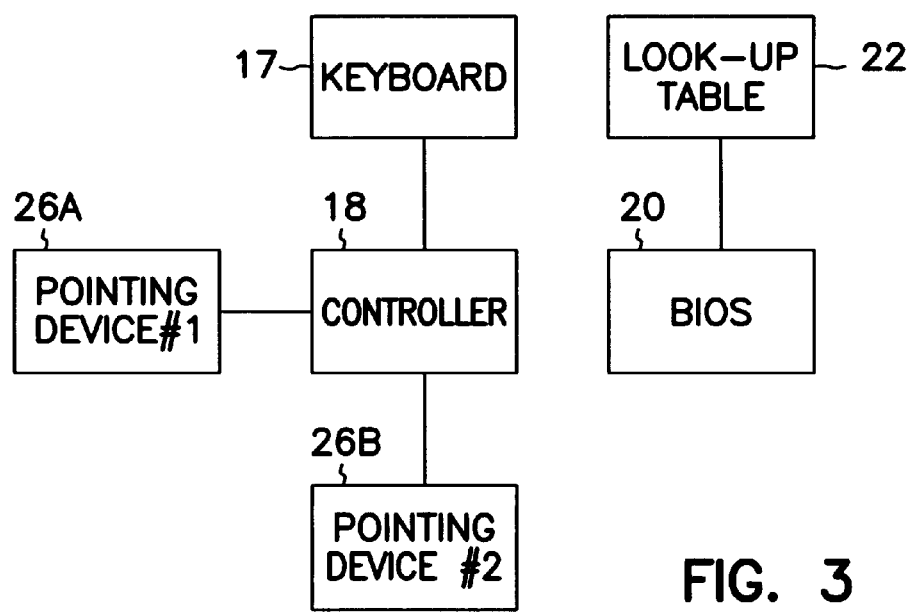
FIG. 3 is a block diagram of another embodiment of the present invention.

Referring now to FIG. 3, an alternative embodiment of the present invention is shown. Keyboard 17' is operatively coupled to controller 18', and corresponds to keyboard 17 of FIG. 2. Controller 18' is a keyboard controller, and corresponds to controller 18 of FIG. 2. Therefore, reference to the discussion of FIG. 2 should be made for further understanding thereto. Controller 18' typically is an integrated circuit (IC), such as the Intel 80C51SL. As discussed in conjunction with FIG. 2, the controller detects sequences of keystrokes entered on keyboard 17' and sends the corresponding scan codes to the BIOS. As shown in FIG. 3, controller 18' sends these scan codes to BIOS 20'. BIOS 20' is a Basic Input/Output System, which is a set of programs permanently installed in the ROM, or alternatively the hard disk drive, of a computer and which provides the most basic control and management of the computer's hardware. Upon boot-up BIOS 20' is usually copied in the RAM of the computer, and it is this copy that is executed by the CPU of the computer. BIOS 20' corresponds to BIOS 20 of FIG. 2. Therefore, reference to the discussion of FIG. 2 should be made for further understanding thereto.

Upon receiving a scan code from controller 18', BIOS 20' determines if the scan code corresponds to one of the ordinary shift keys or one of the keys that are considered to be special shift keys and toggle keys—CTRL, ALT, NUM LOCK, CAPS LOCK, SCROLL LOCK, FUNCTION, INSERT, etc., as has already been discussed in conjunction with BIOS 20 of FIG. 2. If the scan code corresponds to one of these special keys, BIOS 20' maintains a record of which of these keys are being pressed, typically by changing what is known as a "shift state" byte. For all other keys, as has been discussed in conjunction with BIOS 20 of FIG. 2, BIOS 20' translates the scan code by looking up the scan code along with the record of which of the special keys is being pressed in look-up table 22. Look-up table 22' is also typically implemented within the ROM of a computer, and corresponds to table 22 of FIG. 2. Therefore, reference to the discussion in conjunction with FIG. 2 should be made for further understanding thereto.

The embodiment shown in FIG. 3 differs from that shown in FIG. 2 in that the embodiment shown in FIG. 3 allows for the control of two pointing devices, pointing device 26a and pointing device 26b. Each of pointing device 26a and 26b can be internal and residing within the computer, or external to the computer. The present invention is not limited to either pointing device being a particular type of pointing device: either device 26a or 26b can be a mouse, a touch pad, etc. Furthermore, in the embodiment shown in FIG. 2, controller 18 detects two series of keystrokes, one to disable the pointing device, and another to enable the pointing device. In the embodiment shown in FIG. 3, controller 18' detects one sequence of keystrokes.

If BIOS 20' looks up a scan code corresponding to this sequence in look-up table 22', BIOS 20' signals controller 18' to disable or enable pointing devices 26a and 26b according to the next of a series of instructions. As those skilled in the art can appreciate, the invention is not limited to any particular sequence of keystrokes. In one embodiment, this series is holding down the function key while pressing the 'P' key. The invention also is not so limited to any particular series of instructions. In one embodiment, there are two instructions in the series: turn all devices on, and turn all devices off. In this situation, the one sequence of keystrokes acts as a toggle key, toggling between turning the pointing devices on, and turning the devices off. In any case, the series of instructions is typically stored in the ROM of the computer, although the invention is not so limited.

Figure 4:
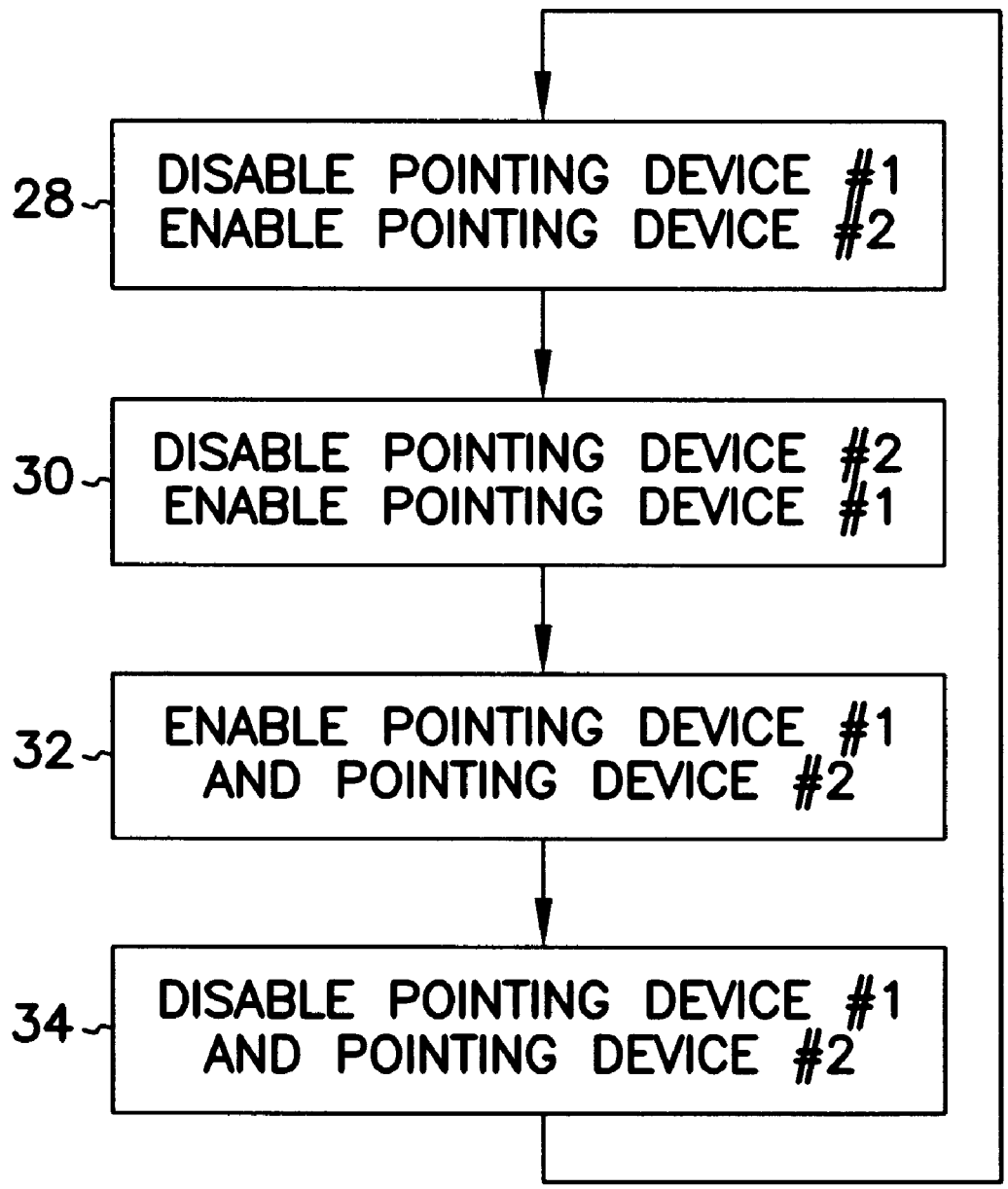
FIG. 4 is a diagram of one embodiment of the repeating series of instructions sent by a BIOS to a keyboard controller under the present invention.

Another series of instructions is shown in FIG. 4. When the one sequence of keystrokes is detected by the controller, the BIOS instructs the controller to enable and disable the pointing devices according to the next instruction within the series. Thus, at instruction 28 the controller is instructed by the BIOS to disable the first pointing device and enable the second pointing device. When the controller detects the one sequence of keystrokes, the BIOS instructs the controller to follow instruction 30, to disable the second pointing device and enable the first pointing device. When the controller again detects the one sequence of keystrokes, the BIOS instructs the controller to follow instruction 32, to enable both pointing devices. When the controller next detects the one sequence of keystrokes, the BIOS instructs the controller to follow instruction 34, to disable both pointing devices. When the controller next detects the one sequence of keystrokes, the BIOS repeats the series and instructs the controller to follow instruction 28.

Referring back to FIG. 3, when controller 18' is signaled by BIOS 20' to disable either device 26a or 26b, controller 18 does not listen to or interpret input from the device. When controller 18' is signaled by BIOS 20' to enable either device 26a or 26b, it listens to and interprets input from the device. Controller 18' either listens to or does not listen to device 26a or 26b in the same manner in which controller 18 either listens to or does not listen to device 24 in the embodiment shown in FIG. 2. Therefore, reference should be made to the discussion in conjunction with FIG. 2 for further understanding thereto.

Thus, the present invention as shown in FIG. 3 works as follows. Controller 18' detects a series of keystrokes entered on the keyboard and sends the scan codes corresponding to the keystrokes to BIOS 20'. BIOS 20' translates the scan code by looking up the scan code, along with the record of which of the shift keys, special shift keys, and toggle keys are also currently being pressed, in look-up table 22'. If the keystrokes entered on the keyboard correspond to the one sequence of keystrokes, then BIOS 20' signals controller 18' to follow the next instruction within the repeating series of instructions. As has already been discussed, one embodiment of the repeating series of instructions is shown in FIG. 4.

The embodiment of the present invention shown in FIG. 3 is different from the embodiment shown in FIG. 2 in that it allows for a "toggle key" sequence of keystrokes if the series of instructions is limited to only two instructions, unlike the embodiment of FIG. 2, which requires a separate sequence for disable than that for enable. Further, the embodiment of the present invention shown in FIG. 3 allows for control of two different pointing devices, unlike that of FIG. 2 which allows for control only of one pointing device. The present invention therefore has the advantage of allowing a user to selectively disable and enable among more than one different input devices connected to the computer.

The present invention also allows for embodiments incorporating modifications to the embodiment shown in FIG. 3, without departing from the spirit or scope therefrom. As shown in FIG. 3, and as has been discussed in conjunction thereto, the BIOS sends instructions to the keyboard controller as to how to act on signals received from the pointing device (i.e., either ignore or interpret them). However, in another embodiment of the invention, these signals from the pointing device as detected by the controller are sent to the BIOS, which itself acts on the signals (either ignoring or interpreting them). Furthermore, as shown in FIG. 3, the BIOS looks up scan codes in the look-up table to determine the appropriate command that either it or the keyboard controller should execute regarding the pointing device. However, in another embodiment of the invention, the lookup table is operably coupled to the controller, and it is the controller that looks up the scan codes in the table, and determines the appropriate command to be executed.

Those of ordinary skill in the art will readily appreciate that many other changes and modifications to the above drawings and description can be made without departure from the spirit or scope of the following claims. For example, the invention as embodied in FIG. 2 is shown to control only one pointing device, whereas modification to control two pointing devices utilizing a separate enabling sequence of keystrokes and a separate disabling sequence of keystrokes does not depart from the scope of the claims. For further example, the invention as embodied in FIG. 3 is shown to control two pointing devices, whereas modification to control only one device utilizing a toggle key sequence of keystrokes does not depart from the scope of the following claims.

We claim:

1. A method for keyboard control of a first pointing device and a second pointing device of a computer comprising:

receiving a command sent by a keyboard controller of the computer in response to detecting a predetermined sequence of at least one keystroke entered by a user of the computer on a keyboard of the computer;

determining a next instruction in a repeating cycle of instructions corresponding to the command and essentially consisting of:
  a first instruction to disable the first pointing device and enable the second pointing device;
  a second instruction to disable the second pointing device and enable the first pointing device;
  a third instruction to enable the first pointing device and the second pointing device; and,
  a fourth instruction to disable the first pointing device and the second pointing device; and, performing the next instruction in the repeating cycle of instructions.

2. The method of claim 1, wherein the command comprises a scan code.

3. The method of claim 1, wherein performing the next instruction comprises sending the next instruction to the keyboard controller.

4. A computer-readable medium having a basic input/output system (BIOS) computer program executable by a computer having a first pointing device, a second pointing device, a keyboard and a keyboard controller, the BIOS computer program comprising:

means for receiving a command sent by the keyboard controller of the computer in response to detecting a predetermined sequence of at least one keystroke entered by a user of the computer on a keyboard of the computer;

means for determining a next instruction in a repeating cycle of instructions corresponding to the command and essentially consisting of:
  a first instruction to disable the first pointing device and enable the second pointing device;
  a second instruction to disable the second pointing device and enable the first pointing device;
  a third instruction to enable the first pointing device and the second pointing device; and,
  a fourth instruction to disable the first pointing device and the second pointing device; and, means for performing the next instruction in the repeating cycle of instructions.

5. The medium of claim 4, wherein the medium is selected from the group essentially consisting of: a random-access memory (RAM), a hard disk drive, a read-only memory (ROM), and a floppy disk.

* * * * *